(12) United States Patent
Becker et al.

(10) Patent No.: US 8,699,007 B2
(45) Date of Patent: Apr. 15, 2014

(54) DEVICE FOR OPTICALLY SCANNING AND MEASURING AN ENVIRONMENT

(75) Inventors: Reinhard Becker, Ludwigsburg (DE); Norbert Homann, Pleidelsheim (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/190,742

(22) Filed: Jul. 26, 2011

(65) Prior Publication Data

US 2012/0019806 A1 Jan. 26, 2012

Related U.S. Application Data

(60) Provisional application No. 61/380,416, filed on Sep. 7, 2010.

(30) Foreign Application Priority Data

Jul. 26, 2010 (DE) .......................... 10 2010 032 725

(51) Int. Cl.
*G01C 3/08* (2006.01)

(52) U.S. Cl.
USPC ......... 356/4.01; 356/5.01; 356/3.05; 356/5.1; 358/505; 358/474

(58) Field of Classification Search
USPC .......................... 356/5.01, 4.1, 4.01; 382/106
See application file for complete search history.

(56) References Cited

U.S. PATENT DOCUMENTS

| | | | |
|---|---|---|---|
| 3,830,567 A | 8/1974 | Riegl | |
| 3,899,145 A | 8/1975 | Stephenson | |
| 3,945,729 A | 3/1976 | Rosen | |
| 4,733,961 A | 3/1988 | Mooney | |
| 4,736,218 A | 4/1988 | Kutman | |
| 4,984,881 A | 1/1991 | Osada et al. | |
| 5,155,684 A | 10/1992 | Burke et al. | |

(Continued)

FOREIGN PATENT DOCUMENTS

| | | |
|---|---|---|
| AT | 508635 A1 | 3/2011 |
| AU | 2005200937 A1 | 9/2006 |

(Continued)

OTHER PUBLICATIONS

Merriam-Webster (m-w.com), "Interface". 2012. http://www.merriam-webster.com/dictionary/interface.*

(Continued)

*Primary Examiner* — Luke Ratcliffe
*Assistant Examiner* — Samantha K Abraham
(74) *Attorney, Agent, or Firm* — Cantor Colburn LLP

(57) ABSTRACT

A device for optically scanning and measuring an environment, which is designed as a laser scanner, with a light emitter, which emits an emission light beam, with a light receiver which receives a reception light beam which is reflected from an object (O) in the environment of the laser scanner or scattered otherwise, and with a control and evaluation unit which, for a multitude of measuring points (X), determines at least the distance to the object (O), the laser scanner has a swivel-axis module which, as a pre-assembled assembly, on the one hand is provided with a base resting in the stationary reference system of the laser scanner and, on the other hand, with parts which can be fixed to a carrying structure of the measuring head which is rotatable relative to the base.

2 Claims, 4 Drawing Sheets

(56) References Cited

U.S. PATENT DOCUMENTS

Figure 1:
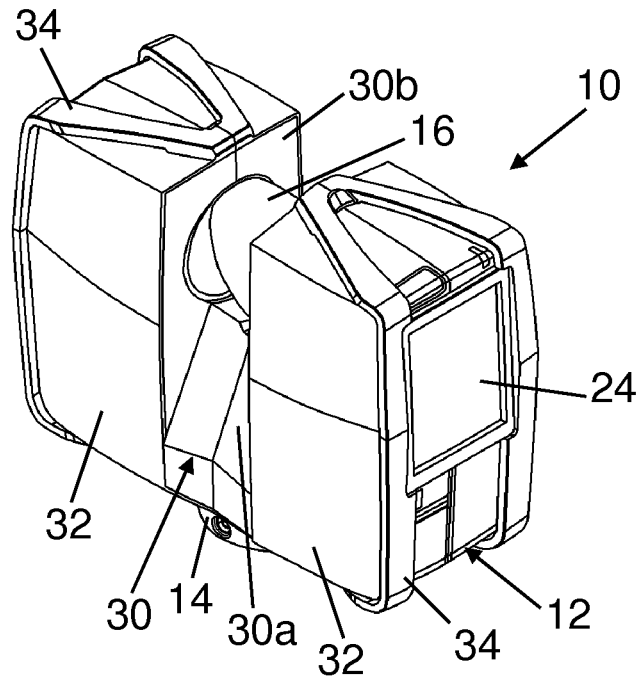

| | | |
|---|---|---|
| 5,218,427 A | 6/1993 | Koch |
| 5,313,261 A | 5/1994 | Leatham et al. |
| 5,329,347 A | 7/1994 | Wallace et al. |
| 5,329,467 A | 7/1994 | Nagamune et al. |
| 5,371,347 A | 12/1994 | Plesko |
| 5,402,365 A | 3/1995 | Kozikaro et al. |
| 5,446,846 A | 8/1995 | Lennartsson |
| 5,517,297 A | 5/1996 | Stenton |
| 5,629,756 A | 5/1997 | Kitajima |
| 5,675,326 A | 10/1997 | Juds et al. |
| 5,677,760 A | 10/1997 | Mikami et al. |
| 5,734,417 A | 3/1998 | Yamamoto et al. |
| 5,745,225 A | 4/1998 | Watanabe et al. |
| 5,793,993 A | 8/1998 | Broedner et al. |
| 5,894,123 A | 4/1999 | Ohtomo et al. |
| 5,898,490 A | 4/1999 | Ohtomo et al. |
| 5,933,267 A | 8/1999 | Ishizuka |
| 5,936,721 A | 8/1999 | Ohtomo et al. |
| 5,940,170 A * | 8/1999 | Berg et al. .................. 356/5.1 |
| 5,940,181 A | 8/1999 | Tsubono et al. |
| 5,988,862 A | 11/1999 | Kacyra et al. |
| 6,040,898 A | 3/2000 | Mrosik et al. |
| 6,069,700 A | 5/2000 | Rudnick et al. |
| 6,077,306 A | 6/2000 | Metzger et al. |
| 6,115,511 A | 9/2000 | Sakai et al. |
| 6,149,112 A | 11/2000 | Thieltges |
| 6,349,249 B1 | 2/2002 | Cunningham |
| 6,445,446 B1 | 9/2002 | Kumagai et al. |
| 6,480,270 B1 | 11/2002 | Studnicka et al. |
| 6,483,106 B1 | 11/2002 | Ohtomo et al. |
| 6,504,602 B1 | 1/2003 | Hinderling |
| 6,512,575 B1 | 1/2003 | Marchi |
| 6,650,402 B2 | 11/2003 | Sullivan et al. |
| 6,675,122 B1 | 1/2004 | Markendorf et al. |
| 6,710,859 B2 | 3/2004 | Shirai et al. |
| 6,750,873 B1 | 6/2004 | Bernardini et al. |
| 6,825,923 B2 | 11/2004 | Hamar et al. |
| 6,847,436 B2 | 1/2005 | Bridges |
| 6,856,381 B2 | 2/2005 | Christoph |
| 6,917,415 B2 | 7/2005 | Gogolla et al. |
| 6,965,843 B2 * | 11/2005 | Raab et al. .................. 702/152 |
| 7,029,126 B2 * | 4/2006 | Tang ............................. 353/81 |
| 7,069,124 B1 | 6/2006 | Whittaker et al. |
| 7,076,420 B1 | 7/2006 | Snyder et al. |
| 7,127,822 B2 | 10/2006 | Kumagai et al. |
| 7,140,213 B2 * | 11/2006 | Feucht et al. ................. 70/186 |
| 7,190,465 B2 | 3/2007 | Froehlich et al. |
| 7,193,690 B2 | 3/2007 | Ossig et al. |
| 7,285,793 B2 | 10/2007 | Husted |
| 7,352,446 B2 | 4/2008 | Bridges et al. |
| 7,430,068 B2 * | 9/2008 | Becker et al. ................. 358/511 |
| 7,541,830 B2 | 6/2009 | Fahrbach et al. |
| 7,659,995 B2 | 2/2010 | Knighton et al. |
| 7,733,544 B2 | 6/2010 | Becker et al. |
| 7,798,453 B2 | 9/2010 | Maningo et al. |
| 7,834,985 B2 | 11/2010 | Morcom |
| 7,847,922 B2 | 12/2010 | Gittinger et al. |
| 7,869,005 B2 | 1/2011 | Ossig et al. |
| 7,900,714 B2 | 3/2011 | Milbourne et al. |
| 7,935,928 B2 | 5/2011 | Seger et al. |
| 7,994,465 B1 | 8/2011 | Bamji et al. |
| 7,995,834 B1 | 8/2011 | Knighton et al. |
| 8,020,657 B2 | 9/2011 | Allard et al. |
| 8,117,668 B2 | 2/2012 | Crampton et al. |
| 8,152,071 B2 * | 4/2012 | Doherty et al. ........... 235/472.01 |
| 8,269,984 B2 | 9/2012 | Hinderling et al. |
| 8,310,653 B2 | 11/2012 | Ogawa et al. |
| 8,384,914 B2 | 2/2013 | Becker et al. |
| 2002/0059042 A1 | 5/2002 | Kacyra et al. |
| 2002/0143506 A1 | 10/2002 | D'Aligny et al. |
| 2002/0149694 A1 | 10/2002 | Seo |
| 2002/0176097 A1 | 11/2002 | Rodgers |
| 2003/0043386 A1 | 3/2003 | Froehlich et al. |
| 2003/0090646 A1 | 5/2003 | Riegl et al. |
| 2003/0137449 A1 | 7/2003 | Vashisth et al. |
| 2003/0179361 A1 | 9/2003 | Ohtomo et al. |
| 2004/0004727 A1 | 1/2004 | Yanagisawa et al. |
| 2004/0027554 A1 | 2/2004 | Ishinabe et al. |
| 2004/0135990 A1 | 7/2004 | Ohtomo et al. |
| 2004/0158355 A1 | 8/2004 | Holmqvist et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2005/0046823 A1 | 3/2005 | Ando et al. |
| 2005/0111514 A1 | 5/2005 | Matsumoto et al. |
| 2005/0141052 A1 | 6/2005 | Becker et al. |
| 2005/0172503 A1 | 8/2005 | Kumagai et al. |
| 2005/0190384 A1 | 9/2005 | Persi et al. |
| 2006/0061566 A1 | 3/2006 | Verma et al. |
| 2006/0088044 A1 | 4/2006 | Hammerl |
| 2006/0109536 A1 | 5/2006 | Mettenleiter et al. |
| 2006/0193521 A1 | 8/2006 | England, III et al. |
| 2006/0241791 A1 | 10/2006 | Pokorny et al. |
| 2007/0058154 A1 | 3/2007 | Reichert et al. |
| 2007/0064976 A1 | 3/2007 | England, III |
| 2007/0100498 A1 | 5/2007 | Matsumoto et al. |
| 2007/0118269 A1 | 5/2007 | Gibson et al. |
| 2007/0122250 A1 * | 5/2007 | Mullner, Jr. .................. 411/408 |
| 2007/0150111 A1 | 6/2007 | Wu et al. |
| 2007/0171394 A1 | 7/2007 | Steiner et al. |
| 2007/0181685 A1 | 8/2007 | Zhu et al. |
| 2007/0229929 A1 | 10/2007 | Soreide et al. |
| 2008/0052808 A1 * | 3/2008 | Leick et al. ...................... 2/411 |
| 2008/0075326 A1 | 3/2008 | Otani et al. |
| 2008/0154538 A1 | 6/2008 | Stathis |
| 2008/0177183 A1 * | 7/2008 | Courtney et al. ............. 600/463 |
| 2008/0273758 A1 | 11/2008 | Fuchs et al. |
| 2008/0309546 A1 | 12/2008 | Wakayama et al. |
| 2009/0021351 A1 | 1/2009 | Beniyama et al. |
| 2009/0046752 A1 | 2/2009 | Bueche et al. |
| 2009/0051938 A1 | 2/2009 | Miousset et al. |
| 2009/0095047 A1 | 4/2009 | Patel et al. |
| 2009/0100949 A1 * | 4/2009 | Shirai et al. .................. 74/89.14 |
| 2009/0133494 A1 | 5/2009 | Van Dam et al. |
| 2009/0161091 A1 | 6/2009 | Yamamoto |
| 2009/0323742 A1 | 12/2009 | Kumano |
| 2010/0030421 A1 | 2/2010 | Yoshimura et al. |
| 2010/0049891 A1 | 2/2010 | Hartwich et al. |
| 2010/0134596 A1 | 6/2010 | Becker |
| 2010/0195086 A1 | 8/2010 | Ossig et al. |
| 2010/0277472 A1 | 11/2010 | Kaltenbach et al. |
| 2011/0025905 A1 | 2/2011 | Tanaka |
| 2011/0066781 A1 | 3/2011 | Debelak et al. |
| 2012/0035788 A1 | 2/2012 | Trepagnier et al. |
| 2012/0035798 A1 | 2/2012 | Barfoot et al. |
| 2012/0046820 A1 | 2/2012 | Allard et al. |
| 2012/0154786 A1 | 6/2012 | Gosch et al. |
| 2012/0169876 A1 | 7/2012 | Reichert et al. |

FOREIGN PATENT DOCUMENTS

| | | |
|---|---|---|
| CN | 1735789 | 2/2006 |
| CN | 1838102 A | 9/2006 |
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10361870 A1 | 7/2005 |

(56) References Cited

FOREIGN PATENT DOCUMENTS

| | | |
|---|---|---|
| DE | 102004015111 A1 | 10/2005 |
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102006024534 A1 | 11/2007 |
| DE | 102007037162 A1 | 2/2009 |
| DE | 102008014274 A1 | 8/2009 |
| DE | 102009035336 B3 | 11/2010 |
| DE | 102010032726 B3 | 11/2011 |
| DE | 102010032725 A1 | 1/2012 |
| DE | 202011051975 U1 | 2/2013 |
| DE | 102012107544 B3 | 5/2013 |
| EP | 0667549 A2 | 8/1995 |
| EP | 0727642 A1 | 8/1996 |
| EP | 0838696 A1 | 4/1998 |
| EP | 0949524 A1 | 10/1999 |
| EP | 1056987 A1 | 6/2000 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 1112941 | 5/1968 |
| GB | 2222695 A | 3/1990 |
| GB | 2336493 A | 10/1999 |
| GB | 2388661 A | 11/2003 |
| GB | 2447258 A | 9/2008 |
| JP | H0357911 A | 3/1991 |
| JP | H04115108 A | 4/1992 |
| JP | H04267214 A | 9/1992 |
| JP | H0572477 A | 3/1993 |
| JP | 07128051 A | 5/1995 |
| JP | H07229963 A | 8/1995 |
| JP | 0815413 A | 1/1996 |
| JP | 0821714 A | 1/1996 |
| JP | H08129145 A | 5/1996 |
| JP | H08136849 A | 5/1996 |
| JP | H08262140 A | 10/1996 |
| JP | 1123993 A | 1/1999 |
| JP | 2000121724 A | 4/2000 |
| JP | 2000249546 A | 9/2000 |
| JP | 2000339468 A | 12/2000 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003202215 A | 7/2003 |
| JP | 2004109106 A | 4/2004 |
| JP | 2004245832 A | 9/2004 |
| JP | 2004348575 A | 12/2004 |
| JP | 2005055226 A | 3/2005 |
| JP | 2005069700 A | 3/2005 |
| JP | 2005215917 A | 8/2005 |
| JP | 2006038683 A | 2/2006 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2009063339 A | 3/2009 |
| JP | 2009541758 A | 11/2009 |
| JP | 2010169405 A | 8/2010 |
| WO | 89/05512 | 6/1989 |
| WO | 97/11399 | 3/1997 |
| WO | 0020880 A2 | 4/2000 |
| WO | 0026612 | 5/2000 |
| WO | 0063645 | 10/2000 |
| WO | 0063681 A2 | 10/2000 |
| WO | 02084327 A2 | 10/2002 |
| WO | 2005008271 A2 | 1/2005 |
| WO | 2005059473 A2 | 6/2005 |
| WO | 2006000552 A1 | 1/2006 |
| WO | 2006053837 A1 | 5/2006 |
| WO | 2007012198 A1 | 2/2007 |
| WO | 2007051972 A1 | 5/2007 |
| WO | 2007087198 A1 | 8/2007 |
| WO | 2007118478 A1 | 10/2007 |
| WO | 2008019856 A1 | 2/2008 |
| WO | 2008048424 A2 | 4/2008 |
| WO | 2008068791 A1 | 6/2008 |
| WO | 2009053085 A1 | 4/2009 |
| WO | 2009095384 A2 | 8/2009 |
| WO | 2009123278 A1 | 10/2009 |
| WO | 2010108644 A1 | 9/2010 |
| WO | 2011021103 A1 | 2/2011 |
| WO | 2012061122 A1 | 5/2012 |
| WO | 2012013525 A2 | 8/2012 |
| WO | 2012103525 A2 | 8/2012 |

OTHER PUBLICATIONS

Merriam-Webster (m-w.com), "Traverse". 2012. http://www.merriam-webster.com/dictionary/traverse.*

Merriam-Webster (m-w.com), "Parts". 2012. http://www.merriam-webster.com/dictionary/parts.*

International Search Report for International Patent Application PCT/EP2004/014605; Date of Mailing Apr. 15, 2005.

International Search Report for International Application No. PCT/EP2006/003010; Date of Mailing Nov. 12, 2006.

International Search Report for International Patent Application PCT/EP2010/001779; Date of Mailing Jul. 20, 2010.

International Search Report for International Patent Application PCT/EP2010/001780; Date of Mailing Jul. 23, 2010.

International Search Report for International Patent Application PCT/EP2010/001781; Date of Mailing Jul. 22, 2010.

International Search Report for International Patent Application PCT/IB2010/002258; Date of Mailing Jan. 28, 2011.

International Search Report of the International Searching Authority for PCT/EP2010/006866; Date of Mailing Mar. 14, 2011.

International Search Report of the International Searching Authority for PCT/EP2010/006868; Date of Mailing Mar. 14, 2011.

International Search Report of the International Searching Authority for PCT/EP2009/050887; Date of Mailing May 14, 2009.

Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/GetPDFServlet?filetype=pdf&id=PSISDG002059000001000316000001&idtype=cvips&doi=10.117/12.150236&prog=normal>[retrieved on Mar. 8, 2011] the whole document.

Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].

Williams, J.A., et al., Evaluation of a Novel Multiple Point Set Registration Algorithm, Copyright 2000, [Retrieved on Jan. 18, 2010 at 04:10 from IEEE Xplore].

Written Opinion of the International Searching Authority for International Patent Application PCT/EP2010/006867; mailing date Mar. 18, 2011.

International Search Report of the International Searching Authority for PCT/IB2010/002216; Date of Mailing Feb. 3, 2011.

International Search Report for International Application No. PCT/EP2007/005789; Date of Mailing Oct. 30, 2007.

International Search Report for International Patent Application PCT/IB2010/002226; Date of Mailing Dec. 13, 2010.

Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.

Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77 , XP002590306.

Brenneke, C., et al., "Using 3D Laser Range Data for Slam in Outdoor Environments", Proceedings of the 2003 IEEE/RSJ Interna-

(56) References Cited

OTHER PUBLICATIONS tional Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
Chinese Publication No. CN 1445509, published Oct. 1, 2003—English Abstract Not Available; EP Equivalent 1347267 previously on May 14, 2009—English Abstract provided.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002576995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report and Written Opinion for International Application No. PCT/EP2007/005789; Date of Mailing Oct. 30, 2007.
International Preliminary Report on Patentability and Written Opinion for PCT/IB2010/002216; Date of Issuance Jan. 24, 2012.
International Preliminary Report on Patentability and Written Opinion for Application No. PCT/EP2009/050887; Date of Issue Sep. 7, 2010.
International Preliminary Report on Patentability and Written Opinion for International Patent Application PCT/IB2010/002226; Date of Issuance Jan. 24, 2012.
International Preliminary Report on Patentability and Written Opinion for Application No. PCT/EP2004/014605; Date of Issue Aug. 29, 2006.
iQsun Laserscanner Brochure, 2 Pages, Apr. 2005.
International Preliminary Report on Patentability and Written Opinion for International Patent Application PCT/EP2009/050888; Date of Issuance Sep. 7, 2010.
International Search Report of the International Searching Authority and Written Opinion for PCT/EP2009/009174; Date of Mailing May 25, 2010.
International Search Report of the International Searching Authority for PCT/EP2010/006867; Date of Mailing Mar. 18, 2011.
English Abstract Not Available for DE202006005643. Equivalent to U.S. Publication 20100134596A1, published Jun. 3, 2010.
English Abstract Not Available for DE20320216U1. Equivalent to U.S. Patent 7,733,544 B2 issued Jun. 8, 2011 and U.S. Patent 7,430,068 B2 issued Sep. 30, 2008.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/Robot.2001.932908 ISBN: 978-0-7803-6576-6, the whole document.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for Application No. PCT/EP2011/003264; Date of Mailing Oct. 19, 2011.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
International Search Report of the International Searching Authority for Application No. PCT/EP2011/001662; Date of Mailing May 26, 2011.
Written Opinion of the International Searching Authority for Application No. PCT/EP2011/001662; Date of Mailing May 26, 2011.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Ingensand, H., Dr., "Introduction to Geodetic Metrology", "Einfuhrung in die Geodatische Messtechnik", Federal Institute of Technology Zurich, Edition 2004, p. 16.
FARO Laserscanner LS, Presentation Forensic Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Leica Geosystems, FBI Crime Scene Case Study.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.
International Preliminary Report on Patentability and Written Opinion for PCT/EP2010/006866; Date of Issuance May 22, 2012.
International Preliminary Report on Patentability and Written Opinion for PCT/EP2010/006867; Date of Issuance May 22, 2012.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.
International Preliminary Report on Patentability and Written Opinion for PCT/EP2010/006868; Date of Issuance May 22, 2012.
International Preliminary Report on Patentability and Written Opinion for PCT/EP2009/009174; Date of Issuance Aug. 16, 2011.
Leica Geosystems TruStory Forensic Analysis by Albuquerque Police Department, 2006.
Langford, et al., "Practical Skills in Forensic Science", Pearson Education Limited, Essex, England, First Published 2005, Forensic Chemistry.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
Se, et al., "Instant Scene Modeler for Crime Scene Reconstruction", MDA, Space Missions, Ontario, Canada, Copyright 2005, IEEE.
The Scene, Journal of The Association for Crime Scene Reconstruction, Apr.-Jun. 2006, vol. 12, Issue 2.
Written Opinion of the International Searching Authority for Application No. PCT/EP2006/003010; Date of Mailing Dec. 11, 2006.
Chinese Notification of First Office Action for Chinese Application No. 201080003463.3; Issued Oct. 30, 2012 (translated).
International Search Report of the International Searching Authority for Application No. PCT/EP2011/003262; Date of Mailing Sep. 30, 2011.
Akca, Devrim, Full Automated Registration of Laser Scanner Point Clouds, Institute of Geodesy and Photogrammetry, Swiss Federal Institute of Technology, Zuerich, Switzerland; Published Dec. 2003.
First Office Action and Search Report with English Translation for Chinese Patent Application No. 201080003456.3; Issue Date Jan. 17, 2013.
First Chinese Office Action for Application No. 201080003467.1; Office Action Issue Date Feb. 5, 2013; (translated).
Chinese Office Action for Chinese Application Serial No. 201080047516.1; Date of Issue Apr. 1, 2013.
Elstrom, M.D., Stereo-Based Registration of LADAR and Color Imagery, Part of SPIE Conference on Intelligent Robots and Com-

(56) References Cited

OTHER PUBLICATIONS puter Vision XVII: Algorithms, Techniques, and Active Vision, Boston, MA, Nov. 1998, SPIE vol. 3522, 0277-786X/98; [Retrieved on-line], Downloaded From: http://proceedings.spiedigitallibrary.org/on Jan. 26, 2013.
GB Examination Report dated Mar. 27, 2013 for GB Application No. GB1303390.7.
GB Examination Report dated Mar. 27, 2013 for GB Application No. GB1303382.4.
International Preliminary Report on Patentability for International Application Serial No. PCT/EP2011/003261. International filing date Jul. 1, 2011. Date of Issuance Jan. 29, 2013.
International Preliminary Report on Patentability for International Application Serial No. PCT/EP2011/003262. International filing date Jul. 1, 2011. Date of Issuance Jan. 29, 2013.
International Preliminary Report on Patentability for International Application Serial No. PCT/EP2011/003263. International filing date Jul. 1, 2011. Date of Issuance Jan. 29, 2013.
International Preliminary Report on Patentability for International Application Serial No. PCT/EP2011/003264. International filing date Jul. 1, 2011. Date of Issuance Jan. 29, 2013.
International Search Report of the International Searching Authority for Application No. PCT/US2012/075178; Date of Mailing Apr. 9, 2013.
"Scanner Basis Configuration for Riegl VQ-250", Riegl Company Webpage, Feb. 16, 2011, XP002693900, Retrieved from the internet: URL:http://www.riegl.com/uploads/tx_pxpriegldownloads/30_SystemConfiguration_VQ-250_02-11_16-02-2011.pdf [retrieved on Mar. 15, 2013] the whole document.
Written Opinion of the International Searching Authority for Application No. PCT/US2012/075178; Date of Mailing Apr. 9, 2013.
Germany Office Action for DE Application No. 10 2012 107 544.1; Issued Jan. 2, 2013.
International Search Report of the International Searching Authority for Application No. PCT/EP2009/050888; Date of Mailing Sep. 15, 2009.
Second Office Action with English Translation for Chinese Patent Application No. 201080003466.7; Issue Date Jul. 19, 2013.
German Office Action for DE Application Serial No. 102012109481.0; dated Aug. 1, 2013.
Leica Geosystems, FBI Crime Scene Case Study, in Opposition of EP Application No. 07785873.6 in Oral Proceedings held on Jun. 27, 2013, Munchen, Germany; D13, p. 5 of Summons, Tony Grissim, Feb. 2006.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
Japanese Office Action for JP Application No. 2012-534589; issued Jul. 30, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
Japanese Office Action for JP Application Serial No. 2012-501175; Date of Mailing Jul. 16, 2013.
Japanese Office Action for JP Application Serial No. 2013-520990; Date of Mailing Jul. 2, 2013.
First Chinese Office Action for Chinese Patent Applicaiton No. 2013082200801190; Dated Aug. 27, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.
Second German Office Action for DE Application Serial No. 10 2009 015 922.3; Dated Dec. 2, 2013.
GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
German Office Acton for DE Application No. 102013102.554.4; Dated Jan. 9, 2014.

* cited by examiner

DEVICE FOR OPTICALLY SCANNING AND MEASURING AN ENVIRONMENT

CROSS-REFERENCE TO RELATED APPLICATIONS

This application claims the benefit of German Patent Application No. DE 10 2010 032 725.5, entitled "DEVICE FOR OPTICALLY SCANNING AND MEASURING AN ENVIRONMENT," filed Jul. 26, 2010, and of U.S. Provisional Patent Application No. 61/380,416, entitled "DEVICE FOR OPTICALLY SCANNING AND MEASURING AN ENVIRONMENT," filed Sep. 7, 2010, both of which are incorporated herein by reference in their entirety.

BACKGROUND

The invention relates to a laser scanner. By means of a device such as is known for example from DE 20 2006 005 643 U1, and which is designed as a laser scanner, the environment of the laser scanner can be optically scanned and measured.

The invention is based on improving a laser scanner.

SUMMARY OF THE INVENTION

The components of the laser scanner are arranged in two parts of the measuring head and in a traverse of the carrying structure, which connects said parts. In order to reduce weight of the laser scanner, a shell is provided as part of the housing, preferably one shell for each of the two parts of the measuring head, wherein said shell can be made of a light material, for example plastic material, and covers the corresponding components of the laser scanner in order to protect them. To protect the shell in turn, a yoke is provided, preferably one yoke for each of the shells, which partially covers the outside of the shell and which can be made of a light material, for example aluminum, as well.

The carrying structure, which, for weight purposes, preferably is made of aluminum as well, preferably has walls, which serve for fixing the components with the optics and the rotating mirror. The walls can also close the semi-open shells. The yoke preferably extends along the outer edges and/or diagonally over the outer surfaces of the shell and is fixed to the carrying structure, preferably at its ends, if and when necessary also in its center, at one of the two walls. In addition to the protective function, also further functions can be integrated into the yoke.

The parameters of the laser scanner, particularly temperature, can change during operation. Comparative measuring is necessary for a correction. It is suggested to move the spot of the emission light beam temporarily along a prism, which has a known geometry and a known distance to the center of the laser scanner. The prism additionally has at least two different brightness levels and/or colors, in order to generate different signal levels of the reception light beam. The different brightness levels and/or colors alternate preferably along the direction of motion of the spot of the emission light beam.

During the rotation of the mirror, the emission light beam is projected onto the traverse of the carrying structure once during every turn, without the environment below being able to be measured. The prism therefore is preferably configured at the traverse. A particular geometrical shape, perpendicular to the direction of motion of the spot of the emission light beam (or in direction of motion), can take account of the imaging properties of the receiving optics and thus control the resulting signal quality. By means of the different brightness levels and/or colors and the known distance of the prism, the control and evaluation unit carries out a (correction of the) distance correction.

For assembling the laser scanner the components have mechanical and electrical interfaces. Particularly between the parts, which are rotatable relative to one another, a high precision is required then. The laser scanner therefore is provided with a swivel-axis module, which, as a pre-assembled assembly, on the one hand is provided with the base resting in the stationary reference system of the laser scanner and, on the other hand, with parts which can be fixed to the carrying structure of the measuring head, which is rotatable relative to the base. The interfaces, which are rotatable relative to one another, are then displaced into the interior of the interface module. The interfaces between the swivel-axis module and the further parts of the measuring head can be configured (more) simply, so that, when inserting the swivel-axis module, for example into a receiving slot of the carrying structure, they are closed in the direction of insertion.

In the laser scanner, the motors for rotating the measuring head and the mirror, as well as the control and evaluation unit and the further electronic components generate heat, which must be removed. For this purpose, the laser scanner is provided with an integrated cooling device, based on a ventilation. Hereby, the air is led by an air inlet into a space between the carrying structure and the shell, serving as a housing, from where it gets through a suction duct, which is sealed with respect to the interior of the carrying structure, into the interior of the cooling device. From there, a fan blows the heated-up air through a further outlet duct, which is sealed with respect to the interior of the carrying structure, and through an air outlet to the outside. The heat can thus preferably be removed without impairing the tightness of central components. One filter at air inlet and air outlet each, avoids intrusion of dust and coarse dust particles into the spaces and ducts of the cooling device. The air inlet and the air outlet are orientated, for example by means of ribs, in that the air streams point away from each other, i.e. unintersectedly, into directions which are spread apart as possibly. The suction duct and the outlet duct, having for example a rectangular profile, are connected to the housing of the fan in a sealed manner. Additionally, if required, the ducts can be completely sealed by means of suitable plugs. Each of the preferably two shells is semi-open and closed by a wall of the carrying structure, the air inlet and the air outlet meeting preferably exactly one of the two shells, sealed with respect to one another and with respect to the space. A sealing of the shells, which are arranged outside, against the carrying structure thus guarantees a complete sealing of the laser scanner. In addition to this ventilation, the cooling device preferably is provided with passive cooling elements, for example cooling fins and/or heat pipes, in order to transfer heat (from sections of the interior of the carrying structure) to the active cooling elements. This can be the heat from the electronics or, if the carrying structure is subdivided into two halves which are sealed with respect to one another, the heat from the other half (without active cooling elements) of the carrying structure.

DETAILED DESCRIPTION OF THE DRAWINGS

Figure 2:
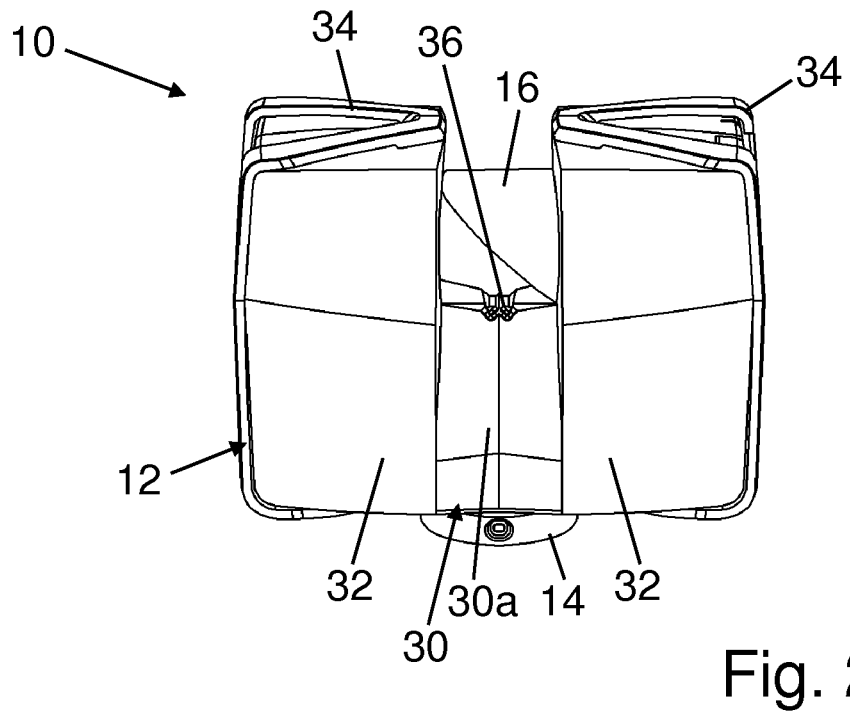
Figure 3:
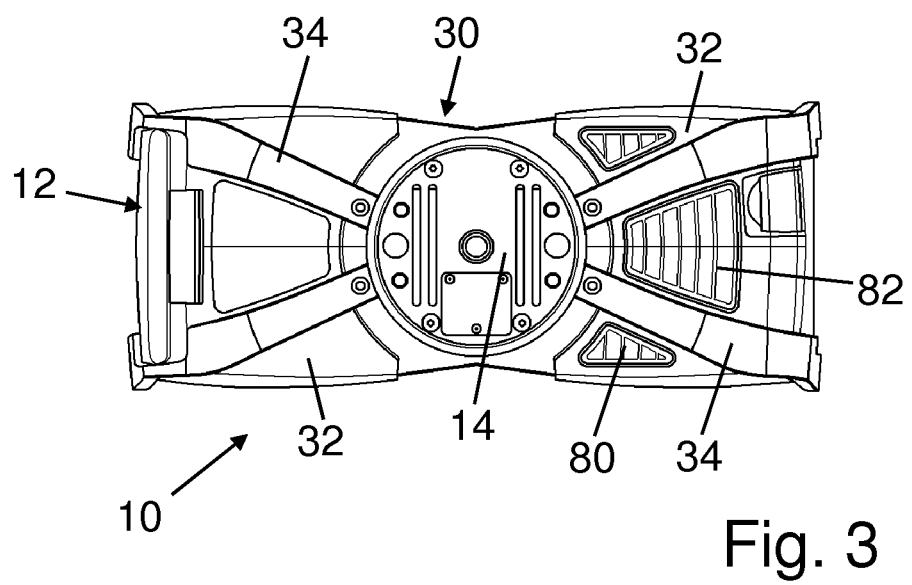
Figure 4:
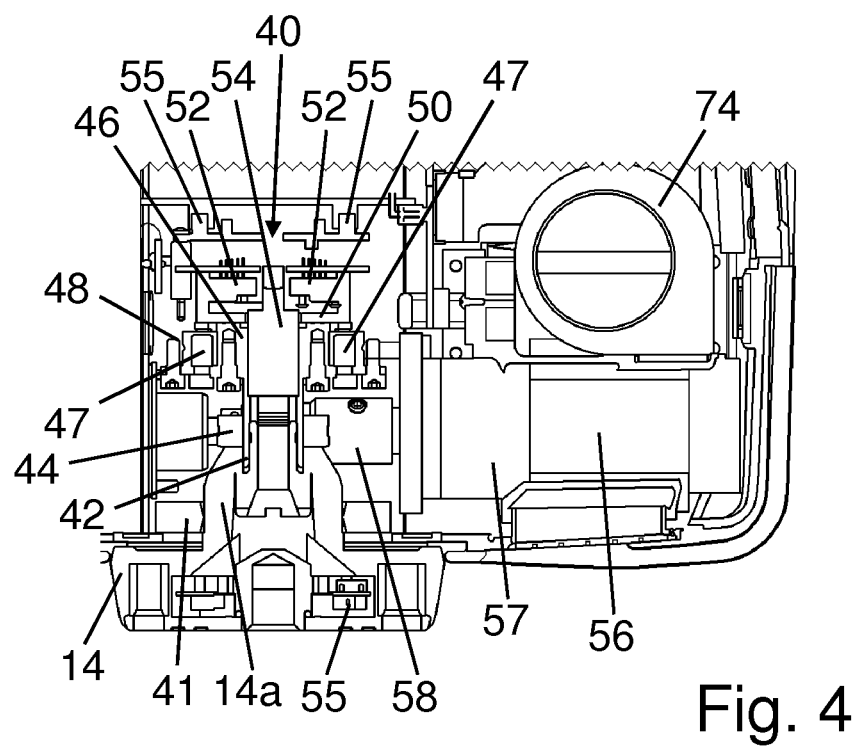
Figure 5:
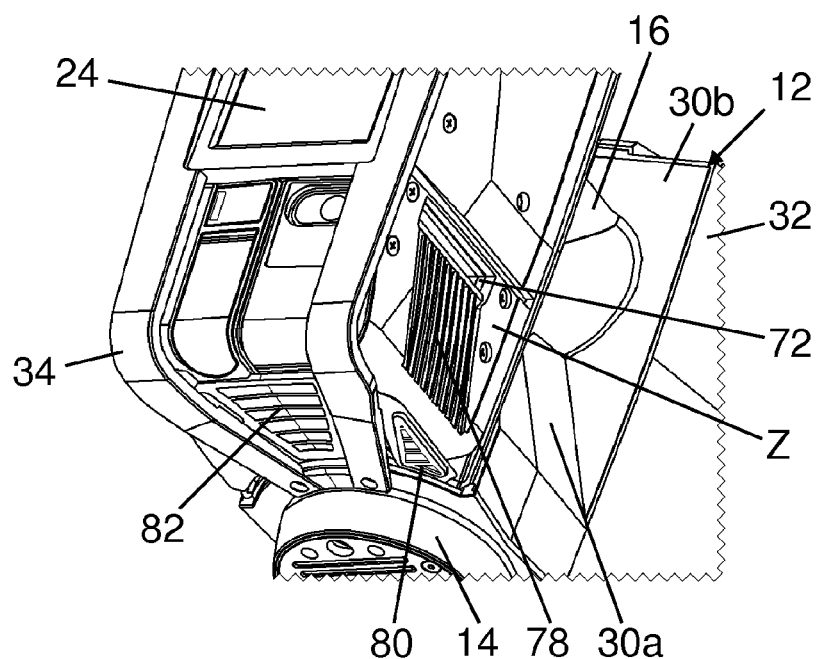
Figure 6:
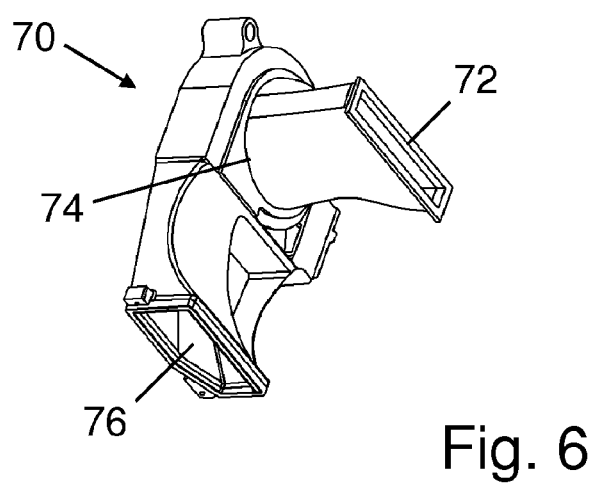
Figure 7:
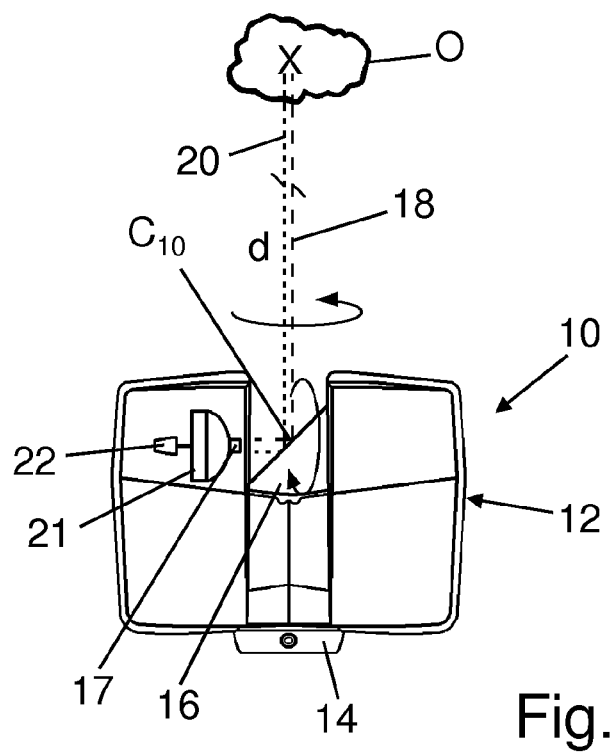

The invention is explained in more detail below on the basis of an exemplary embodiment illustrated in the drawing, in which FIG. 1 shows a perspective illustration of the laser scanner, FIG. 2 shows a slightly perspective lateral view of the laser scanner, FIG. 3 shows the bottom view of the laser scanner, FIG. 4 shows a section of the laser scanner in the zone of the swivel-axis module, FIG. 5 shows a perspective partial view of the laser scanner without shell, FIG. 6 shows a partial view of the cooling device with the perspective of FIG. 5, FIG. 7 shows a schematic illustration of the laser scanner during operation;

FIGS. 8 and 9 show, in exploded form, the two separate modules shown in FIG. 4.

DETAILED DESCRIPTION

A laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16, which can be rotated about a horizontal axis. The intersection point of the two rotational axes is designated center $C_{10}$ of the laser scanner 10.

The measuring head 12 is further provided with a light emitter 17 for emitting an emission light beam 18. The emission light beam 18 is preferably a laser beam in the range of approx. 300 to 1600 nm wave length, for example 790 nm, 905 nm or less than 400 nm, on principle, also other electromagnetic waves having, for example, a greater wave length can be used, however. The emission light beam 18 is amplitude-modulated, for example with a sinusoidal or with a rectangular-waveform modulation signal. The emission light beam 18 is emitted by the light emitter 17 onto the rotary mirror 16, where it is deflected and emitted to the environment. A reception light beam 20 which is reflected in the environment by an object O or scattered otherwise, is captured again by the rotary mirror 16, deflected and directed onto a light receiver 21. The direction of the emission light beam 18 and of the reception light beam 20 results from the angular positions of the rotary mirror 16 and the measuring head 12, which depend on the positions of their corresponding rotary drives which, in turn, are registered by one encoder each.

A control and evaluation unit 22 has a data connection to the light emitter 17 and to the light receiver 21 in measuring head 12, whereby parts of it can be arranged also outside the measuring head 12, for example a computer connected to the base 14. The control and evaluation unit 22 determines, for a multitude of measuring points X, the distance d between the laser scanner 10 and the (illuminated point at) object O, from the propagation time of emission light beam 18 and reception light beam 20. For this purpose, the phase shift between the two light beams 18 and 20 can, for example, be determined and evaluated.

Scanning takes place along a circle by means of the (quick) rotation of the rotary mirror 16. By virtue of the (slow) rotation of the measuring head 12 relative to the base 14, the whole space is scanned step by step, by means of the circles. The entity of measuring points X of such a measurement is designated scan. For such a scan, the center $C_{10}$ of the laser scanner 10 defines the origin of the local stationary reference system. The base 14 rests in this local stationary reference system.

In addition to the distance d to the center $C_{10}$ of the laser scanner 10, each measuring point X comprises a brightness information which is determined by the control and evaluation unit 22 as well. The brightness value is a gray-tone value, which is determined, for example, by integration of the bandpass-filtered and amplified signal of the light receiver 21 over a measuring period which is attributed to the measuring point X. A color camera can optionally generate pictures, by means of which colors (R, G, B) can be assigned to the measuring points as values.

A display device 24 is connected to the control and evaluation unit 22. The display device 24 is integrated into the laser scanner 10, in the present case into the measuring head 12 The display device 24 shows a preview of the scan.

The laser scanner 10 has a carrying structure 30, which serves as "skeleton" of the measuring head 12 and at which different components of the laser scanner 10 are fixed. In the present case, the metal carrying structure 30 is made of aluminum and in one piece. Above the base 14, the carrying structure 30 has a traverse 30a which is visible from outside and which, at both ends, carries two walls 30b, which are parallel to one another and project upwards from the traverse 30a. Two shells 32 are configured as a housing, which is open to one side, preferably made of plastic. Each of the two shells 32 covers part of the components of the laser scanner 10 which are fixed to the carrying structure 30 and is assigned to one of the two walls 30b, to which it is fixed (sealed with a sealing). The walls 30b and the shells 32 thus serve as housing of the laser scanner 10.

On the outer side of each of the two shells 32 a—preferably metal—yoke 34 is arranged, which partially covers and thus protects the assigned shell 32. Each yoke 34 is fixed to the carrying structure 30, and more precisely on the bottom of the traverse 30a. In the present case, each yoke 34 is made of aluminum and screwed to the traverse 30a at the side of the base 14. Each yoke 34 extends from its fixing point at the bottom of the traverse 30a obliquely to the next outer corner of the assigned shell 32, from where it extends along the outer edge of shell 32 to the outer corner of shell 32 which is above, on the upper side of shell 32 obliquely up to the wall 30b, a short distance along it (may be with an additional fixing point), and then mirror-symmetrically to the described course on the upper side of shell 32, obliquely to the other outer corner, along the outer edge of shell 32 to the outer corner of shell 32 which is below and obliquely to the other fastening point at the bottom side of traverse 30a.

The two yokes 34 together circumscribe a (convex) space, within which the two shells 32 are completely arranged, i.e. the two yokes 34 together project over all outer edges and outer surfaces of the shells 32. On top and on the bottom the oblique sections of the yokes 34 project over the top and/or bottom of the shells 32, on the four other sides, two sections each extending along an outer edge of the shells 32. The shells 32 are thus protected extensively. Although each of the yokes 34 primarily has a protective function, particularly with respect to impacts which might damage the shells 32 and the components of the laser scanner 10 which are arranged below, further functions can be integrated in one or both of the yokes 34, for example a gripping possibility for carrying the laser scanner 10 and/or an illumination.

On top of the traverse 30a a prism 36 is provided, which extends parallel to the walls 30b. In the present case, the prism 36 is an integrally formed (i.e. designed in one piece) component of the carrying structure 30, but a separate formation and fastening to the traverse 30a is conceivable as well. When the mirror 16 rotates, it directs the emission light beam 18 onto the traverse, and more precisely onto the prism 36, once during each rotation, and moves the spot, which is generated by the emission light beam 18, along the prism 36. Perpendicularly to the sense of movement of the spot of emission light beam 18, the profile of the prism 36 is designed in such a way that, from the top of the traverse 30a, two trapezoids pointing downwards are designed, from which an isosceles triangle pointing upwards projects. Usually, the spot of the emission light beam 18 is so small that is hits the top of the triangle, but illuminates the sides only partially. The surface of the prism 36 is designed in such a way that at least two different brightness levels and/or colors are provided along the direction of motion of the spot of emission light beam 18. For example, the half that is illuminated first can have a high brightness level ("light grey," "white"), and the half that is illuminated next a low brightness level ("dark grey," "black"). A reverse order or a striped pattern with several changes of the brightness level is possible as well.

Due to non-linearities in the electronic components, for example in the light receiver 21, the measured distances d depend on signal intensity, i.e. brightness, temperature and further parameters. A distance correction, which is stored as a function of brightness and is non linear, is therefore necessary. Since the prism 36 has a known distance d and known brightness levels, a correction of the distance correction can be performed by means of the prism 36, namely online, i.e. during operation the influence of temperature and other parameters can be compensated. At the points corresponding to the brightness levels of the prism 36, the difference between the known distance and measured distance is determined. The correction of the distance correction is performed by adapting the curve of distance correction to the determined difference. This correction of distance correction preferably takes place in the control and evaluation unit 22.

The traverse 30a has a receiving slot which is open at the bottom, and into which a swivel-axis module 40 is introduced. The swivel-axis module 40 is a pre-assembled assembly, which comprises, on the one hand, parts which are to be fixed at the carrying structure 30 and, on the other hand, the base 14—which is rotatable in relation to said parts—and parts which are fixed to it. The base 14 is provided with a dome 14a, which protrudes upward. A sealing 41 is interposed between the dome 14a and the carrying structure 30. A swivel axis 42, which protrudes vertically upward, is fixed to the dome 14a, in the present case screwed. A horizontally arranged worm gearing 44 is fixed to the swivel axis 42. The swivel axis 42 has an inner head 46, which, by means of a crossed roller bearing 47, bears an outer head 48. A horizontally arranged encoder disk 50 is fixed to the upper end of the inner head 46, above which the outer head 48 has encoder read heads 52. Besides, slip rings 54 for the internal (i.e. which takes place within the swivel-axis module 40) transmission of data and energy of power supply are provided between the inner head 46 and the outer head 48. At the upper end of the outer head 48 and at the lower end of the base 14, electric plug connectors 55 for the transmission of data and energy from and to the measuring head 12 are provided.

For interaction with the worm gearing 44 a motor 56 with a planetary gear 57 is provided, which is borne in the carrying structure 30 and which drives a worm 58, which meshes with the worm gearing 44. The described swivel-axis module 40 is introduced into the traverse 30a, so that the plug connectors 55 at the outer head 48 are plugged together with suitable counter-contacts, the worm 58 meshes with the worm gearing 44, the outer head 48 can be fixed to the carrying structure 30 and a sealing 41 59 comes to lie between the base 14 and the carrying structure 30. In the swivel-axis module 40, the swivel axis 42, the worm gearing 44, the inner head 46 and the encoder disk 50 are fixed to the base 14, while, rotatably relative to this, the outer head 48 and the encoder read heads 52 are fixed to the carrying structure 30, and the motor 56 with the planetary gear 57 and the worm 58 are borne. The measuring head 12 is thus rotatable about a vertical axis, relative to the base 14.

The laser scanner 10 has an integrated cooling device 70 which cools by means of air flowing through sealed ducts. The cooling device 70 comprises a suction duct 72, which preferably is designed with a rectangular profile, a fan 74 and an outlet duct 76, which preferably is designed with a rectangular profile as well. The fan 74 with its housing is connected to the suction duct 72 and to the outlet duct 76 in a sealed manner. The suction duct 72 is arranged between the motor 56 for the swiveling movement of the measuring head 12 and a motor for the rotation of the mirror 16 which is arranged above. The outlet duct 76 is arranged between the motor 56 and the electronics.

The suction duct 72 opens to a (largely) sealed space Z between the carrying structure 30 and the shell 32. The sealing of the space Z (with respect to the interior of the carrying structure 30) prevents intrusion of dirt and dust into the interior of the carrying structure. The carrying structure 30 has cooling fins 78 next to the motor 56, which transfer the heat from the interior of the carrying structure 30 into the space Z. From outside, the air gets over an air inlet 80, preferably a ventilation grille with ribs, into the space Z. A filter (for example a filter mat) at the air inlet 80 prevents intrusion of coarse dust particles and dust into the space Z.

The outlet duct 76 terminates—sealed with respect to the space Z—at an air outlet 82, preferably a ventilation grille with ribs. The air inlet 80 and the air outlet 82 are spaced apart from each other and, in the present case, are separated by the yoke 34 and configured on the bottom of the shell 32. The ribs of the ventilation grilles are preferably aligned in such a way that the air flow to the air inlet 80 and from the air outlet 82 point away from one another, i.e. no heated-up air is sucked in. Additionally, a heat pipe extends between the area of the measuring head 12 with the control and evaluation unit 22 and the suction duct 72, said heat pipe transferring heat to the cooling device 70 as well. The fan 74 sucks in air via the air inlet 80, the space Z and the suction duct 72 and blows the air again out of the laser scanner 10, via the outlet duct 76 and the air outlet 82. Cooling thus takes place.

The laser scanner 10 preferably has different sensors, for example thermometer, inclinometer, altimeter, compass, gyroscopic compass, GPS, etc. which are preferably connected to the control and evaluation unit 22. By means of said sensors the operating conditions of the laser scanner 10 are monitored, which are defined by certain parameters, for example geometric orientation or temperature. If one or several parameters have a drift, this is recognized by the corresponding sensors and can be compensated by the control and evaluation unit 22. By means of said sensors, also a sudden change of operating conditions can be recognized, for example an impact on the laser scanner 10 which changes its orientation, or a displacement of the laser scanner 10. If the extent of said changes cannot be registered with sufficient precision, the scanning process must be interrupted or aborted. If the extent of said changes of operating conditions can be roughly estimated, the measuring head 12 can be turned back by some angular degrees (until there is an overlapping with the area which has been scanned before the sudden change), and the scanning process continues. The two different parts of the scan can be assembled by an evaluation of the overlapping area.

The invention claimed is:

1. A device for optically scanning and measuring an environment comprising:
    a first module, a second module, and a control and evaluation unit;
    the first module including:
        a carrying structure having a bottom side;

a light emitter;
a light receiver;
a rotary mirror;
a first motor;
a first encoder;
a receiving slot; and
a first electrical connector;
wherein the light emitter, the light receiver, the first motor, and the first electrical connector are attached to the carrying structure, the light emitter emits an emission light beam, the light receiver receives a reflection of the emission light beam as a reception light beam, the rotary mirror is rotated about a first axis by the first motor to deflect the emission light beam about the first axis in a first circle and to deflect the reception light beam to the light receiver, the first encoder measures the rotation of the rotary mirror with respect to the carrying structure about the first axis, the receiving slot is located in the bottom side of the carrying structure, includes the first electrical connector, and receives the second module;

the second module including:
a first portion;
a second portion;
a second encoder;
at least one bearing;
at least one slip ring; and
a second electrical connector;
wherein the first portion is received by the receiving slot, the second portion includes a base that rotates with respect to the first portion about a second axis in a second circle, the second encoder includes an encoder disk and at least one encoder read head that measures the rotation about the second axis of the second portion with respect to the first portion, the at least one bearing is placed between the first portion and the second portion, the at least one slip ring conducts an electrical signal between the first portion and the second portion, and the second electrical connector is attached to the first portion;

wherein when the first portion is received in the receiving slot and the second module is fixed to the first module, the first electrical connector connects with the second electrical connector, the first axis intersects the second axis at a center of the laser scanner, the second motor is enabled to rotate the first portion and the carrying structure about the second axis, and the device is enabled to optically scan the environment about the first circle and the second circle; and the control and evaluation unit being connected to the light emitter and to the light receiver and determining a plurality of distances from the center of the laser scanner to a plurality of points in the environment based on a propagation time of the emission light beam and the reception light beam.

2. A method of forming a device for optically scanning and measuring an environment comprising:
providing a first module, the first module including:
a carrying structure having a bottom side;
a light emitter attached to the carrying structure that emits an emission light beam;
a light receiver attached to the carrying structure that receives a reflection of the emission light beam from points of interest as reception light beams;
a first motor;
a rotary mirror rotated about a first axis by the first motor to deflect the emission light beam about the first axis in a first circle and to deflect the reception light beams to the light receiver;
a first encoder that measures the rotation of the rotary mirror with respect to the carrying structure about the first axis;
a first electrical connector attached to the carrying structure; and
a receiving slot located in the bottom side of the carrying structure, the receiving slot including the first electrical connector;

providing a second module, the second module including:
a first portion;
a second portion that includes a base that rotates with respect to the first portion about a second axis in a second circle;
a second encoder that includes an encoder disk and at least one encoder read head that measures the rotation about the second axis of the second portion with respect to the first portion;
at least one bearing between the first portion and the second portion;
at least one slip ring that conducts an electrical signal between the first portion and the second portion; and
a second electrical connector connected to the first portion;

inserting the second module into the receiving slot of the first module;
fixing the second module to the first module;
wherein when the second module is received in the receiving slot the first portion attaches to the carrying structure, the first electrical connector connects with the second electrical connector, the first axis intersects the second axis at a center of the laser scanner, the second motor is enabled to rotate the first portion and the carrying structure about the second axis, and the device is enabled to optically scan the environment about the first circle and the second circle;
providing a control and evaluation unit that connects to the light emitter and to the light receiver; and
determining, with the control and evaluation unit a plurality of distances from the center of the laser scanner to the points of interest based on a propagation time of the emission light beam and the reception light beams.

* * * * *